United States Patent [19]

Stone

[11] 4,207,758
[45] Jun. 17, 1980

[54] HIGH SPEED SHAFT FLEXIBLE COUPLING WITH MAXIMUM SHAFT MISALIGNMENT ACCOMMODATION CAPABILITY

[75] Inventor: Robert A. Stone, Sandy Hook, Conn.

[73] Assignee: United Technologies Corporation, Hartford, Conn.

[21] Appl. No.: 916,688

[22] Filed: Jun. 19, 1978

Related U.S. Application Data

[63] Continuation of Ser. No. 666,113, Mar. 11, 1976, abandoned.

[51] Int. Cl.² .............................................. F16D 3/60
[52] U.S. Cl. .......................................... 64/12; 64/19
[58] Field of Search ................ 64/12, 19, 11 R, 15 B

[56] References Cited

U.S. PATENT DOCUMENTS

| 854,426 | 5/1907 | Lowry | 64/12 |
|---|---|---|---|
| 892,842 | 8/1908 | Lowry | 64/12 |
| 1,025,875 | 5/1912 | Lambert | 64/12 |
| 1,114,326 | 10/1914 | Allen | 64/12 |
| 1,124,966 | 1/1915 | Stack | 64/12 |
| 1,316,903 | 9/1919 | Kuentzel | 64/19 |
| 1,752,138 | 3/1930 | Ainsworth | 64/12 |
| 1,777,895 | 10/1930 | Roderick | 64/12 |
| 2,532,755 | 12/1950 | Bloomfield | 64/12 |
| 2,837,901 | 6/1958 | Chapman | 64/12 |
| 3,521,465 | 7/1970 | Bossler, Jr. | 64/12 |
| 3,685,314 | 8/1972 | Flannelly | 64/12 |
| 3,759,064 | 9/1973 | Jorn et al. | 64/12 |

FOREIGN PATENT DOCUMENTS

| 428689 | 7/1945 | Canada . |
| 544499 | 3/1933 | Fed. Rep. of Germany . |
| 660876 | of 1951 | United Kingdom . |

*Primary Examiner*—Ira S. Lazarus
*Assistant Examiner*—Magdalen Moy
*Attorney, Agent, or Firm*—Vernon F. Hauschild

[57] ABSTRACT

A coupling for connecting two high speed rotating shafts and fabricated so as to have torsional and radial stiffness and angular and axial softness and to accommodate maximum misalignment variation between the axes of the shafts so joined.

38 Claims, 10 Drawing Figures

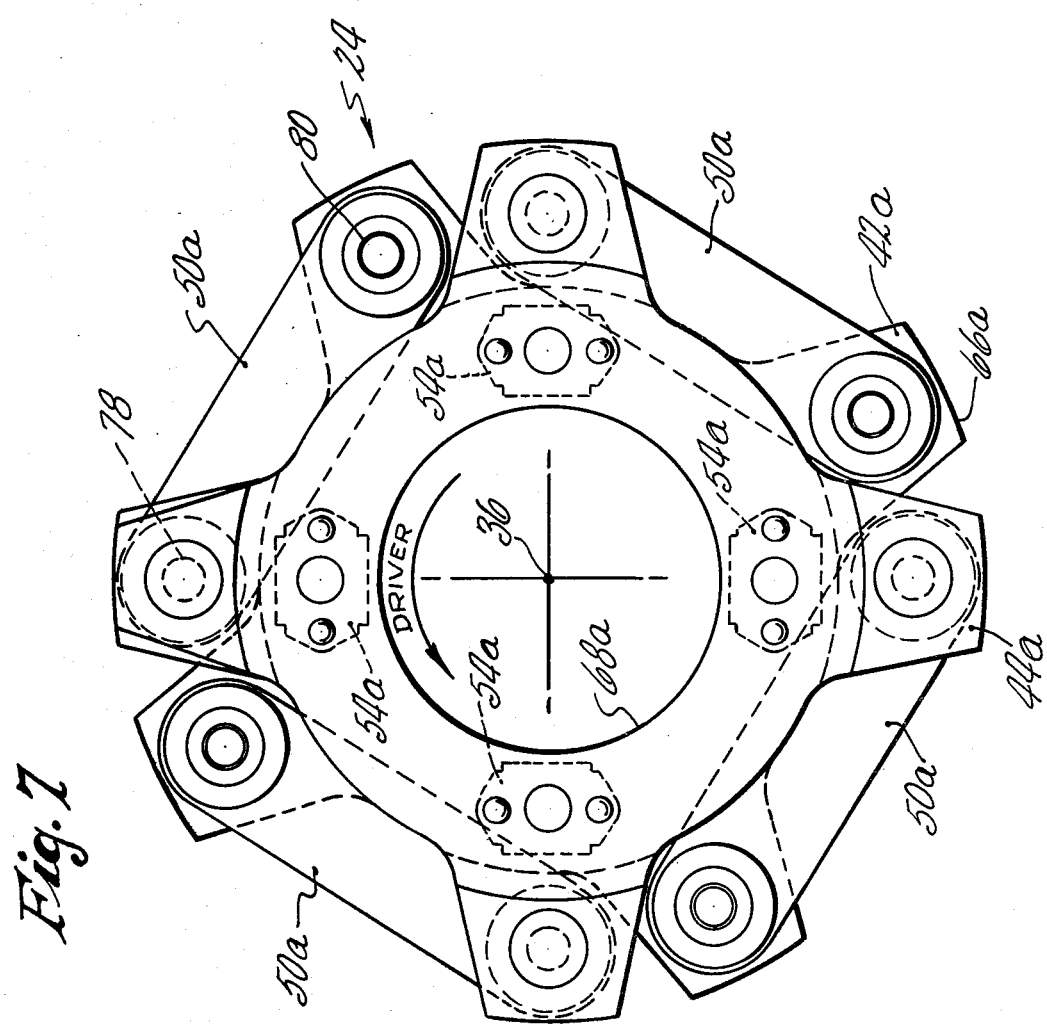

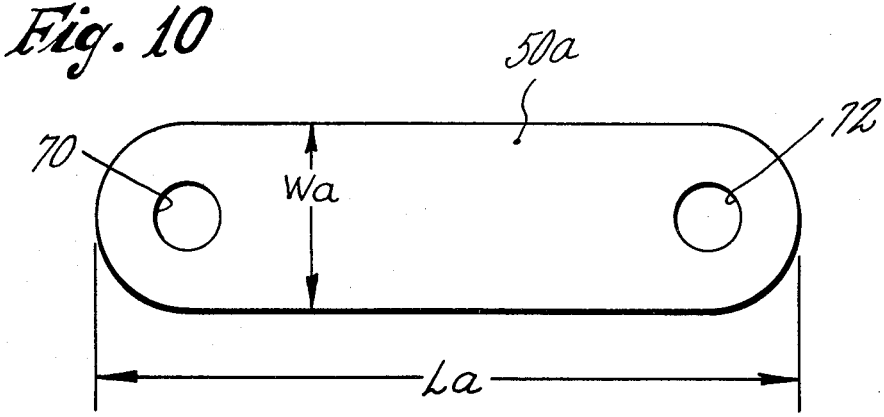
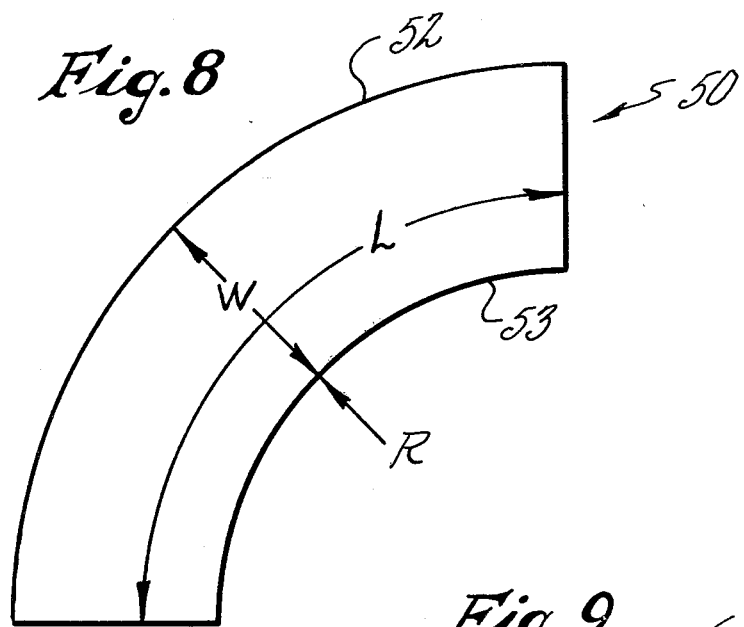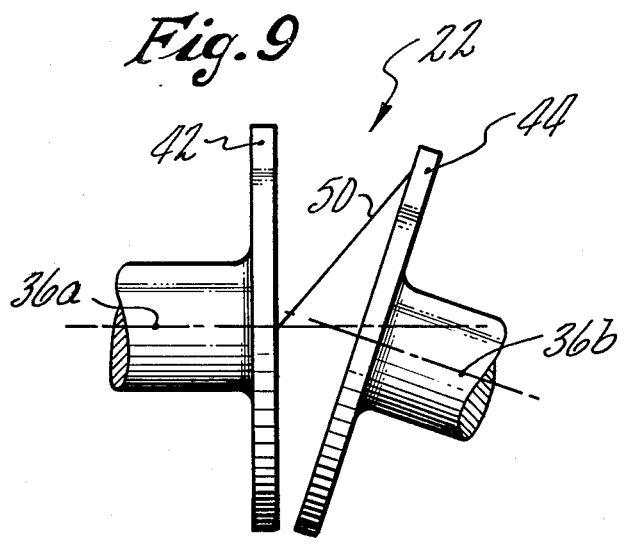

HIGH SPEED SHAFT FLEXIBLE COUPLING WITH MAXIMUM SHAFT MISALIGNMENT ACCOMMODATION CAPABILITY

This invention herein described was made in the course of or under a contract or subcontract thereunder, with the Department of the Army.

This is a continuation, of application Ser. No. 666,113, filed Mar. 11, 1976, now abandoned.

BACKGROUND OF THE INVENTION

1. Field of Invention

This invention relates to flexible couplings and more particularly to couplings which connect shafts rotating at speeds between 6,000 and 25,000 rpm and which require shaft misalignment accommodation in the order of $\pm 1\frac{1}{2}°$. This coupling is also adapted to be part of a shaft-coupling assembly which can be prebalanced and easily assembled between and disassembled from between the driving and driven high speed shaft members.

2. Description of the Prior Art

In the flexible coupling art, a study of available couplings reveals that no such coupling is capable of accommodating shaft misalignment in excess of $\pm \frac{1}{4}°$, nor is there any known prior art in which the coupling load transmitting strap members are all in tension during operation.

Examples of the known prior art include Lambert U.S. Pat. No. 1,025,875 in which in a four strap coupling, two straps only are in tension and hence doing work at any given time, the remaining two straps being in compression and thereby incapable of carrying a load. Kuntzel U.S. Pat. No. 1,316,903 also teaches a coupling in which alternate straps are in compression and tension and hence only half the straps, the straps in tension, are performing a work function. Stack U.S. Pat. No. 1,124,966 teaches a construction in which the strap members are connected to the driving and driven member through a pivot bearing and hence are not flexible straps. Wayne U.S. Pat. No. 1,424,051 uses a double system of links in which the first system has alternate links in compression and tension and in which the second system is used as support members only and not load transferring members so they cannot be deemed to be in tension. Bossler U.S. Pat. No. 3,521,465, Mayerjak U.S. Pat. No. 3,481,158, Gray U.S. Pat. No. 3,004,409, Gustin U.S. Pat. No. 2,181,888 and Meriam U.S. Pat. No. 803,006 also have alternate straps in compression and tension.

SUMMARY OF INVENTION

The primary object of the present invention is to provide a flexible coupling which is capable of connecting shafts rotating at speeds between 6,000 and 25,000 rpm, which can accommodate $\pm 1\frac{1}{2}°$ misalignment between the axes of the shafts so connected, which may be fabricated from metal or composites fabricated from bonded fibers having high tensile strengths and low resistance to flexure, and which have redundant load carrying paths therethrough and is therefore fail-safe.

In accordance with the present invention, the flexible coupling includes flange-type members connected by flexible straps, which straps are each loaded only in tension, are of maximum length and number.

In accordance with a further aspect of the present invention, the flexible coupling is torsionally stiff so that it can transfer torque between the shafts it connects, laterally stiff to avoid shaft eccentricity and thereby maintain shaft dynamic stability, angularly flexible to permit misalignment between the axes of the shafts joined by the coupling, and axially flexible to permit relative axial motion between the shafts joined thereby and to permit ready removal of the coupling per se or an assembly including the coupling.

Another important feature of this coupling is that all hardware involved in the coupling is captured and hence the coupling per se or assemblies including the coupling can be dynamically balanced as a unit before installation.

In accordance with a further feature of this invention, the coupling includes a substantially continuous array of flexible straps about the circumference of the coupling end-flange members, which straps are preferably four in number and each extending through substantially 90° of the end-flange circumference.

BRIEF DESCRIPTION OF THE DRAWINGS

FIG. 6 is a side view of a second modification of my coupling.

FIG. 7 is a view of my FIG. 6 modification of my coupling viewed from the driver shaft side.

FIG. 8 is a showing of one of the flexible straps in the FIGS. 2–5 modification of my flexible coupling.

FIG. 9 is a showing of my flexible coupling to illustrate angular flexibility.

FIG. 10 is a showing of one of the flexible straps in the FIGS. 6–7 modification of my flexible coupling.

DESCRIPTION OF THE PREFERRED EMBODIMENT

Figure 1:
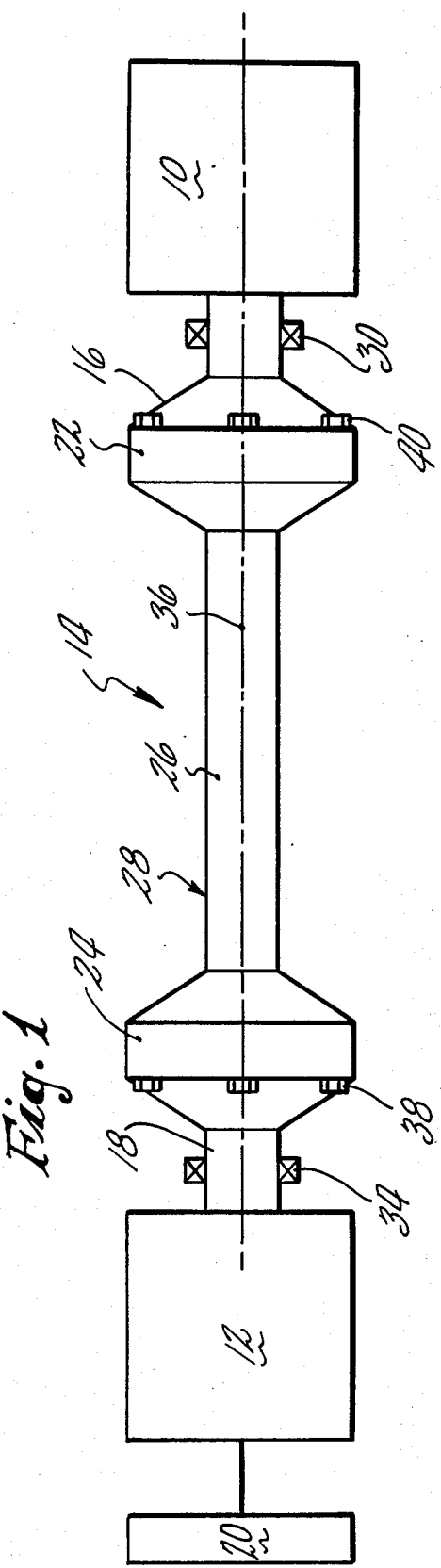
FIG. 1 is a showing of my flexible coupling used in a typical installation in which an engine is driving a transmission.

With advances in technology, flexible couplings are being required to connect shafts which are designed to operate at rotational speeds far in excess of that encountered by the prior art, which carry loads greater than that encountered by the prior art, and which require that the coupling accommodate angular misalignment variations between the joined shaft axes in excess of that encountered by the prior art. A good example of the technology in which such modern flexible couplings are required is in helicopter drive trains which drivingly connect a helicopter rotor transmission to the helicopter engine. The transmission is normally located a substantial distance from the engine for functional reasons and the drive shaft couplings must not only be able to transmit power at relatively high rpm between the engine and the transmission but must also be able to accommodate misalignments, primarily angular misalignment and axial dislacement variation, between the adjacent shafts in the drive train. Both of these misalignments are the result of installation tolerance, part tolerance accumulation, and the static and dynamic deflection of the supporting structures. Couplings which accommodate these misalignments by the utilization of element flexure have found favor with the helicopter industry because such couplings do not have moving parts. Moving or sliding parts absorb power, require lubrication and seals, which, in turn, limit coupling life and adversely affect the environmental usage spectrum.

Flexible couplings are not devoid of problems because the flexure element therein is subjected to alternating stresses which can limit coupling life. In designing a flexible coupling for this usage, the design must insure that the flexure elements are proportioned so that allowable fatigue stresses are not exceeded.

Another important consideration in aircraft coupling design is load path redundancy to provide fail-safe operation. This provision enables the coupling to perform its function in the drive train after a failure of one or more of the driving elements. A fail-safe design is particularly important to military service aircraft which is subject to small arms fire where a single damaged or failed element could endanger the integrity of the drive system and in turn the vehicle itself. In addition, in aircraft installations, radial and torsional stiffness in such a coupling are desirable because these coupling characteristics affect the drive system critical speed. Low axial and bending stiffness under conditions of misalignment are also desirable in that they can prevent the adjacent shafts and supporting hardware from having to accommodate added bending stresses. The aforementioned low bending stiffness which permits the coupling to absorb angular misalignment between the two shafts which it connects, is also very important in commercial helicopters in that it permits optimum performance of the helicopter rotor isolation system whose function is to prevent the rotor vibrations from being imparted to the passenger compartment.

While weight is an important consideration in all aircraft parts, coupling weight in a helicopter drive shaft is particularly important since it is imperative that the coupling be of required strength yet of minimal weight. Since the helicopter drive trains must be capable of operating at shaft speeds between approximately 5,000 and 25,000 rpm, coupling weight is acutely important because it is a factor in imposing stresses on the shaft support bearing system when shaft eccentricity is encountered. As an example, a three pound mass imposes a fifty pound load upon the shaft support bearing system when the shaft system is operating at 25,000 rpm and experiences one mil eccentricity.

The major requirements of a modern high technology flexible coupling, such as those used in drive trains of helicopters, are that the coupling must be: (1) torsionally stiff so that it is capable of transferring driving loads therethrough as the driver shaft, which is connected to one side of the coupling, imparts rotational driving loads to the driven shaft, which is connected to the opposite side of the coupling, (2) laterally or radially stiff, that is, stiffness in a direction normal to the driver and driven shaft axes to maintain shaft dynamic stability, (3) angular flexibility so that the angular displacement between the axes of the two shafts joined through the coupling does not impose undue bending loads upon the shaft support system. In a helicopter drive train angular fexibility in the coupling to permit angular misalignment variation between the joined shaft axes is required, and (4) axial flexibility so that displacement of either shaft along its axis is absorbed by the coupling thereby avoiding the imposition of axial loads on the shaft support system. This axial flexibility also assists in removing the coupling per se or assemblies of parts including the coupling from the drive train.

By referring to FIG. 1, we see a representation of a typical helicopter drive train which is representative of a modern technology use of a flexible coupling. In FIG. 1, engine 10 drives transmission 12 through connecting shaft drive train 14, which includes driver shaft 16 driven by engine 10, and driven shaft 18 which drives transmission 12, which in turn drives helicopter rotor 20. Connecting shaft drive train 14 comprises two such couplings 22 and 24 positioned at opposite ends of shaft member 26 to cooperate therewith in defining shaft-coupling assembly 28, which is drivingly positioned between drive shaft 16 and driven shaft 18. Shafts 16 and 18 are supported by bearing means shown representatively at 30 and 34 so that shafts 16, 18 rotate concentrically about their respective axes.

In the drive train shown in FIG. 1, shaft-coupling assembly 28 can be removed from the train without otherwise disturbing the train by merely removing bolts 38 and 40 and then, in view of the axial flexibility of couplings 22 and 24, shaft-coupling assembly 28 can be removed from between shafts 16 and 18, and is as easily replaced into the drive train.

Referring to FIGS. 2 through 5 we see a first embodiment of the high technology flexible coupling taught herein and which will be identified by reference numeral 22. It should be borne in mind, however, that either the flexible coupling shown in FIGS. 2 through 5 or the flexible coupling shown in FIGS. 6 and 7 could be used as flexible couplings 22 and/or 24 in the FIG. 1 embodiment. Coupling 22 includes flange-type members 42 and 44, which are preferably disc-shaped and axially spaced along axis 36 and with flange-type member 44 adapted to be connected to a driver shaft such as 16 or shaft 26 of FIG. 1 and flange-type member 42 adapted to be connected to either a driven shaft member 18, or shaft 26 of FIG. 1. That is, the coupling is designed to primarily drive in one direction of rotation, its ability to transmit torque in the opposite direction being limited.

It is important to note that flanges 42 and 44 have flat or flush outboard surfaces 46 and 48 which normally lie in planes normal to axis 36 and which, in cooperation with the axial flexibility of coupling 22, assists in its removal or the removal of shaft-coupling assembly 28 from drive trains of the type shown in FIG. 1. A plurality of flexible straps 50 extend between flanges 42 and 44 to serve as a flexible driving connection therebetween. Straps 50 are in the form of circumferential array extending around the complete circumference of flanges 42 and 44 and are shaped so as to have an outer surface 52 of substantially the same circumference as the outer circumference 66 of flanges 42 and 44.

Connecting members 54 are positioned about the periphery of flanges 42 and 44 and serve to connect these flanges to the driving and driven shafts. Connecting units 54 include a bushing 56 which extends through flanges 42 and 44 and are supported therefrom and which is flush with surfaces 46 and 48 thereof. Connecting means 54 also includes nut support member 58, which is connected to an inboard surface of the coupling, such as the inboard surfaces of flanges 42 and 44 and serves to support nut 60 in alignment with bushing 56 so that a conventional bolt may be passed through the abutting flange of the driving and driven shafts and then through bushing 56 for threadable connection to nut 60, thereby attaching coupling 22 in driving relationship between the driving and driven shafts which it connects. Straps 50 are preferably suspended in axial relationship to flanges 42 and 44 by ramp members 62 and 64 at the opposite ends thereof to perform a two-fold function of keeping straps 50 out of physical contact with nut 60 and reducing the bending loads in strap 50 by reducing the axial misalignment between the opposite ends of straps 50.

It will therefore be seen that coupling 22 shown in FIGS. 2–5 is annular in shape and concentric about axis 36, which annular shape is confined between outer circumference 66 and inner circumference 68.

It is intended that coupling 22 be constructed with end-flanges 42 and 44 and straps 50 fabricated of a composite material having high tensile strength and a low bending modulus. Kevlar 29 epoxy is a composite material which may be used for this purpose since it has a tensile strength of 200,000 psi and a bending modulus of 7,500,000 to provide the desired high strength and flexibility desired. The orientation of the high modulus fibers in straps 50 is particularly important in that we wish to take advantage of the fiber high tensile strength for load carrying purposes and its flexibility for misalignment accommodation purposes. It is accordingly very important that the fibers in the composite material forming the flexible straps 50, extend along the strap length between ramps 62 and 64 so that they are positioned to take advantage of the composite properties. Straps 50, ramps 62 and 64 and bushings 56 are integrally bonded to flanges 42 and 44 and connectors 58 are also connected thereto and support nut 60 therefrom, so that coupling 22 is a unit with all hardware involved captured therein. This provides the advantage that either coupling 22 or shaft-coupling assembly 28 (see FIG. 1) can be dynamically balanced as a unit before assembly between the shafts intended to be connected thereby. This capability of dynamically balancing the coupling or the shaft-coupling assembly is very important in the high speed operating regime in which this coupling is intended to be used because the out-of-balance tolerance thereof is minimal. As an example of the criticality thereof, it has been found that if a nut 60 in a given coupling is replaced by a nut of the same part number and intended to be precisely the same as the original nut 60, dynamic balancing of the coupling or the shaft-coupling assembly is normally required after such a nut replacement.

While straps 50 form a continuous strap array about the circumference of flanges 42 and 44, it has been found that four such straps each extending through substantially 90° of the circumference of flanges 42 and 44 provide optimum performance. It should be borne in mind that for other embodiments, a different number of straps might be preferable. In view of the fact that a plurality of straps 50 is used, a redundancy of load paths between flanges 42 and 44 is provided, thereby providing a fail-safe coupling which is capable of operating if one or more of the straps 50 should fail or be ballistically damaged.

The construction of the FIGS. 2–5 modification of my flexible coupling will now be considered to illustrate how it fulfills the aforementioned requirement of a current high technology flexible coupling. Coupling 22 achieves torsional stiffness and is therefore capable of transmitting substantial driving loads between the driving and driven shafts it connects because each of straps 50 is loaded in tension and is fabricated of a composite having very high tensile strength fibers extending along the length thereof. Coupling 22 also has radial stiffness in that, as best shown in FIG. 8, the radial dimension or width W of strap 50 is large such that strap 50 can be considered as a beam member having a large width dimension W and being anchored at its opposite ends so that strap 50 offers substantial resistance to displacement in radial direction R. This radial stiffness characteristic causes the axes of the connected shafts to be maintained in alignment, thereby avoiding shaft and coupling eccentricity and the problems previously described attendant thereto. Coupling 22 also has angular softness in that, due to the flexibility of straps 50 in view of their composite fiber construction, coupling 22, as best illustrated in FIG. 9, is capable of permitting substantial angular misalignment between the axes $36a$ and $36b$ of the driving and driven shafts which they connect. Coupling 22 illustrated herein is capable of accommodating an angular misalignment between axes $36a$ and $36b$ in the amount of $\pm 1.5°$. Finally, the coupling 22 has axial softness in that the length L (see FIG. 8) of strap 50 is substantially greater than strap thickness t (see FIG. 5), and hence strap 50 has substantial flexibility along coupling axis 36.

Figure 5:
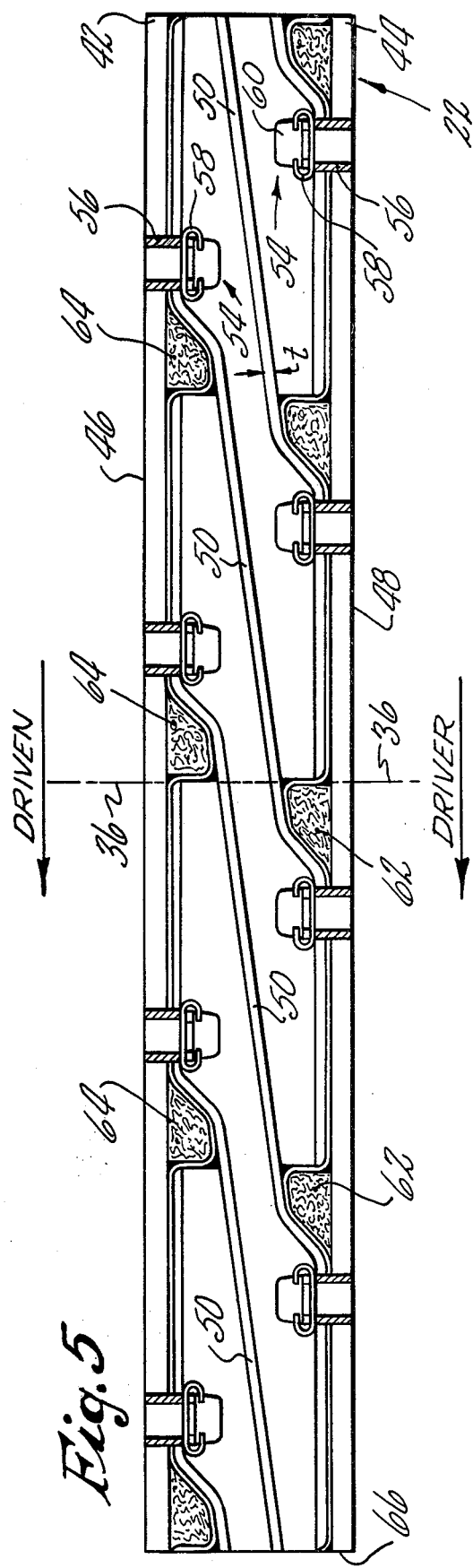
FIG. 5 is a cross-sectional showing taken through the center of the FIG. 2 coupling.
Figure 3:
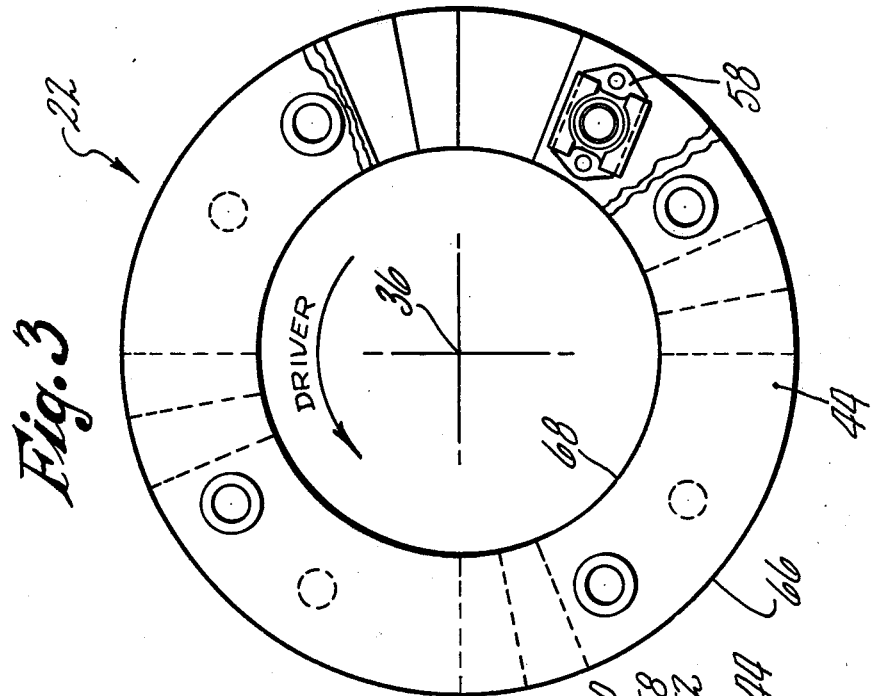
FIG. 3 is a showing of the FIG. 2 coupling when viewed from the driving shaft side.
Figure 2:
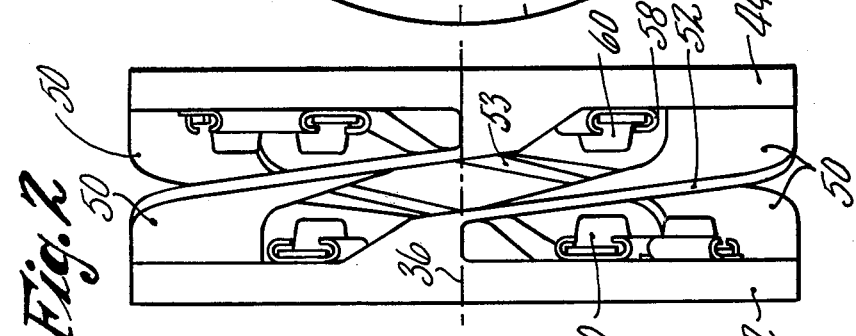
FIG. 2 is a side view of a first modification of my coupling.
Figure 4:
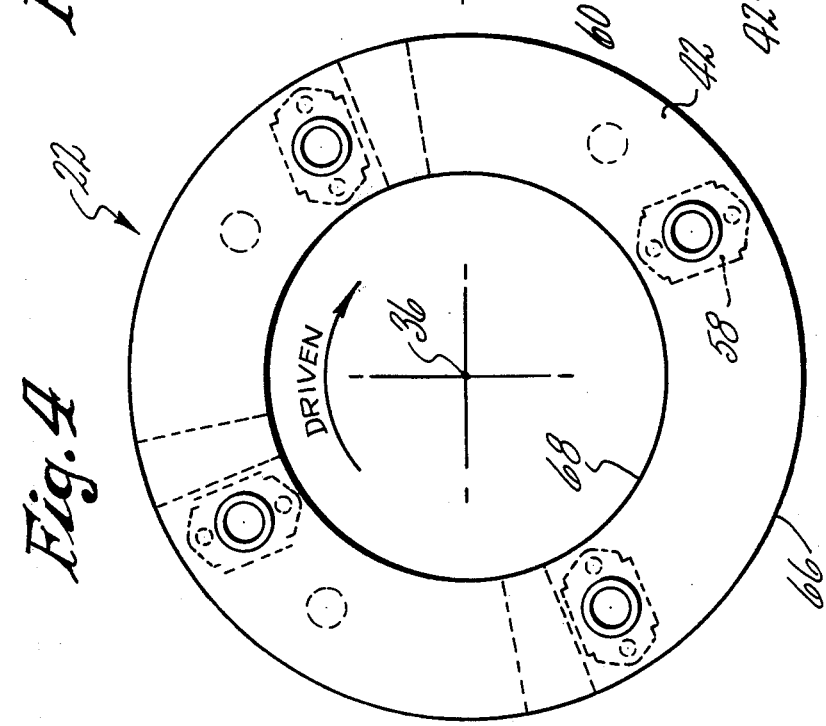
FIG. 4 is a showing of my FIG. 2 coupling when viewed from the driven shaft side.

By viewing FIGS. 5 and 8 it will be noted that the length-to-width ratio (L/W) of strap 50 is substantially smaller than the length-to-thickness ratio (L/t) of strap 50 to thereby provide some of the aforementioned qualities. It will be evident that the smaller the ratio L/W, the greater the strap radial stiffness and the greater the ratio L/t.

A second modification of my flexible coupling is shown in FIGS. 6 and 7 to which reference will now be made. The FIGS. 6–7 flexible coupling will be identified as reference numeral 24, however, in describing the FIGS. 6–7 coupling construction reference numerals corresponding to those used in describing the FIGS. 2–5 coupling construction but with the suffix "a" added thereto will be used. Coupling 24 includes end-flange members $42a$ and $44a$ which have flat or flush exterior surfaces $46a$ and $48a$. Coupling 24 is also of generally annular shape concentric about axis 36 and extends between inner diameter $68a$ and outer diameter $66a$. As in the FIGS. 2–5 construction, end flanges $42a$ and $44a$ are joined solely through flexible strap members $50a$. Straps $50a$ of the FIGS. 6–7 modification differ from straps 50 of the FIGS. 2–5 modification in that they are not arcuate but straight and symmetric about their lengthwise axis and are made of laminated metal having a strap length $L_A$, width $W_A$, and aggregate thickness $t_A$. Straps $50a$ have connecting holes 70 and 72 at its opposite ends and are symmetric about a line joining the centers of bolts 76 of strap end connecting means 74. It will be evident to those skilled in the art that straps $50a$ could also be a composite material as in the FIGS. 2–5 modification with high tension strength members extending parallel to the length thereof.

Connecting means $54a$ corresponding to connecting means 54 in the FIGS. 2–5 construction, are provided throughout the periphery of flanges $42a$ and $44a$ to join the coupling to the driving and driven shafts on opposite sides thereof. Connecting means 74 is used to fixedly attach opposite ends of each strap $50a$ to flange members $42a$ and $44a$. Each of connecting means 74 is preferably identical and includes bolt member 76, which extends through bushed holes 78 in flange $44a$ or flange $42a$, aligned holes in washers 82 and 84, strap $50a$, and nut 86, which threadably engages the shaft of bolt 76 to fixedly attach the opposite ends of straps $50a$ to flange members $42a$ and $44a$, respectively.

In the FIGS. 6–7 modification there are also preferably four straps 50a extending through substantially 90° of arc. In view of their construction, it will be evident to those skilled in the art that the FIGS. 6–7 coupling has torsional and lateral stiffness and angular and axial flexibility, as well as captured hardware, load path redundancy, and ease of replaceability, as does the FIGS. 2–5 modification. It will therefore be noted that the flexible couplings taught herein are unique in that the straps thereof are loaded only in tension so that each strap is carrying its proportional share of the load at all times and hence the coupling is capable of transmitting substantial driving loads between the driving and driven shafts. Further, the straps are of maximum length and high length-to-thickness ratio to provide good axial and angular flexibility. The straps are also of a smaller length-to-width ratio to give the straps radial stiffness. Still further, the straps are many in number to give the system redundant load carrying paths and hence fail-safe qualities, and so used as to afford efficient use of the material and its properties.

Although the invention has been shown and described with respect to preferred embodiments thereof, it should be understood by those skilled in the art that other various changes and omissions in the form and detail thereof may be made therein without departing from the spirit and the scope of the invention.

I claim:

1. A flexible coupling of annular shape and concentric about a coupling axis for drivingly connecting a driving rotating shaft adapted to be driving in a single direction of rotation in operation at speeds up to 25,000 RPM to a driven rotating shaft adapted to be driven in that single direction of rotation in operation at speeds up to 25,000 RPM while permitting substantial misalignment variation between the shaft axes comprising:
   (1) a first flange-type member adapted to be connected to the driving shaft,
   (2) a second flange-type member adapted to be connected to the driven shaft,
   (3) at least three flexible, fixed length strap members positioned in substantially continuous concentric circumferential array about the coupling axis and extending between said flange-type members,
   (4) means directly fixedly connecting a first end of each strap member to said first flange-type member and the other end of each strap member directly and fixedly to said second flange-type member so that said strap members are the sole connection between said first and second flange-type members and determine the location of said coupling axis and are equally loaded in tension at all times as driving loads are imparted therethrough as said first flange-type member drives said second flange-type member so that said strap members react in the equal tension loading thereof to give the coupling torsional stiffness to permit transmittal of substantial loads and stiffness lateral to the coupling axis to avoid eccentricity and provide dynamic stability to the coupling, and so that said strap members react in strap member flexing to give coupling flexibility along the coupling axis to accommodate relative axial motion between the driving and driven shafts, and angular flexibility to accommodate substantial misalignment variation between the driving and driven shaft axes of as high as ±1.5 degrees.

2. A coupling according to claim 1 wherein said connecting means effectively connects the opposite ends of each strap member to an effective connecting point on said first and second flange-type members, respectively, and wherein said strap members are symmetric about a straight line connecting said connecting points.

3. A coupling according to claim 1 wherein each of said strap members has a connecting hole at its opposite ends and wherein each of said straps is symmetric about a straight line drawn between the centers of said connecting holes.

4. A coupling according to claim 1 wherein each of said strap members has a substantially smaller length-to-width ratio than its length-to-thickness ratio so as to accommodate axial and angular misalignment variation between said flange-type members with minimum resistance while presenting substantial resistance to eccentric movement and relative torsional movement between said flange-type members.

5. A coupling according to claim 4 wherein there are four strap members each extending thru substantially 90° of arc of the circumferences of the flange-type members.

6. A coupling according to claim 5 wherein said strap members are composite members with high tensile strength members extending parallel to the length thereof.

7. A coupling according to claim 1 wherein each of said straps is a flat metallic member.

8. A coupling according to claim 1 wherein each of said strap members is a stack of flat metallic members.

9. A coupling according to claim 1 wherein each of said strap members is fabricated to have a substantially greater length-to-width ratio than length-to-thickness ratio thereby minimally resisting axial relative motion and angular displacement variation between the axes of said flange-type members while presenting substantial resistance to relative rotation of said flange-type members about their axes and radial misalignment of the axes of said flange-type members.

10. A shaft and flexible coupling assembly adapted to be positioned between a rotating driving shaft and rotating driven shaft so as to couple the shafts, rotate therewith, impart driving loads therebetween, and permit substantial misalignment variation between the driving and driven shaft axes comprising:
   (1) a shaft member,
   (2) a flexible coupling connected to each of the opposite ends of said shaft member and each such coupling including:
      (a) a first flange-type member adapted to be connected to said shaft member,
      (b) a second flange-type member adapted to be connected to said driving or said driven shaft and
      (c) at least three flexible, fixed length strap members positioned in circumferential array between said first and second flange-type members, and
      (d) means connecting one end of each of said strap members to said first flange-type member and the other end of each of said strap members to said second flange-type member so that as load is imparted therethru as said first flange-type member drives said second flange-type member each of said straps is equally loaded in tension at all times.

11. A coupling according to claim 10 wherein said connecting means effectively connects the opposite ends of each strap member to an effective connecting point on said first and second flange-type members, respectively, and wherein said strap members are symmetric about a straight line connecting said connecting points.

12. A coupling according to claim 10 wherein each of said strap members has a connecting hole at its opposite ends and wherein each of said straps is symmetric about a straight line drawn between the centers of said connecting holes.

13. A coupling according to claim 10 wherein each of said strap members has a substantially smaller length-to-width ratio than its length-to-thickness ratio so as to accommodate axial and angular misalignment variation between said flange-type members with minimum resistance while presenting substantial resistance to eccentric movement and relative torsional movement between said flange-type members.

14. A coupling according to claim 13 wherein there are four strap members each extending thru substantially 90° of arc of the circumferences of the flange-type members.

15. A coupling according to claim 14 wherein said strap members are composite members with high-tensile strength members extending parallel to the length thereof.

16. A coupling according to claim 10 wherein each of said strap members is a flat metallic member.

17. A coupling according to claim 10 wherein each of said strap members is a stack of flat metallic members.

18. A flexible coupling for drivingly connecting a driving rotating shaft to a driven rotating shaft while permitting substantial misalignment variation between the shaft axes comprising:
 (1) a first flange-type member adapted to be connected to the driving shaft and being of circular cross section and concentric about the coupling axis,
 (2) a second flange-type member adapted to be connected to the driven shaft and being of circular cross section and concentric about the coupling axis,
 (3) at least three flexible, fixed length strap members positioned in circumferential array between said flange-type members and with the opposite ends of each strap member being integrally connected to said first and second flange-type members, respectively, so that the location of the coupling axis is determined by the strap members and so that the strap members are equally loaded in tension as driving loads are imparted therethrough as said first flange-type member drives said second flange-type member, and
 (4) each of said strap members being fabricated of a composite material comprising a plurality of high-tensile strength fibers extending along the strap member length and bonded together to form a strap member of high-tensile strength with axial flexibility.

19. A coupling according to claim 18 wherein said first and second flange-type members are disc-shaped members fabricated of bonded high-strength fibers.

20. A coupling according to claim 19 wherein said first and second flange-type members have flat outboard surfaces lying in a plane normal to the coupling axis.

21. A coupling according to claim 20 and including means to connect said first and second flange-type members to the driving and driven shafts including a bushing member supported in and extending through said first and second flange-type members and terminating in said outboard surface, and nut supporting means supported from said flange members and adapted to support a nut at the opposite end of said bushing, and a nut member so supported at the interior end of said bushing.

22. A coupling according to claim 21 including means to support said strap members in spaced axial relation to said first and second flange-type members a sufficient distance so that said strap members are clear of said nut member and are subjected to minimal bending loads when relative axial motion occurs between said flange-type members during coupling operation.

23. A coupling according to claim 22 wherein said first and second flange-type members, said strap members, said connecting means, and said strap support means are operatively connected so that the flexible coupling is a single unit with all hardware captured therein.

24. A flexible coupling according to claim 23 wherein said flexible coupling is of annular shape and concentric about a coupling axis.

25. A coupling according to claim 18 wherein each of said strap members has a substantially smaller length-to-width ratio than its length-to-thickness ratio so as to accommodate axial and angular misalignment variation between said flange-type members with minimum resistance while presenting substantial resistance to eccentric movement and relative torsional movement between said flange-type members.

26. A coupling according to claim 25 wherein said strap members form a substantially continuous circumferential array about the circumferences of said flange-type members.

27. A coupling according to claim 26 wherein there are four strap members each extending thru substantially 90° of arc of the circumferences of the flange-type members.

28. A coupling according to claim 18 wherein each of said strap members is fabricated to have a substantially greater length-to-width ratio than length-to-thickness ratio thereby minimally resisting axial relative motion and angular displacement variation between the axes of said flange-type members while presenting substantial resistance to relative rotation of said flange-type members about their axes and radial misalignment of the axes of said flange-type members.

29. A shaft and flexible coupling assembly according to claim 10 wherein said first and second flange-type members are disc-shaped members fabricated of bonded high-strength fibers.

30. A shaft and flexible coupling assembly according to claim 29 wherein said flexible coupling is of annular shape and concentric about a coupling axis.

31. A shaft and flexible coupling assembly according to claim 30 wherein said first and second flange-type members have flat outboard surfaces lying in a plane normal to the coupling axis.

32. A shaft and flexible coupling assembly according to claim 31 and including means to connect said first and second flange-type members to the driving and driven shafts including a bushing member supported in and extending through said first and second flange-type members and terminating in said outboard surface, and nut supporting means supported from said flange members and adapted to support a nut at the opposite end of said bushing, and a nut member so supported at the interior end of said bushing.

33. A shaft and flexible coupling assembly according to claim 32 wherein said first and second flange-type members, said strap members, and said connecting means are operatively connected so that the flexible coupling is a single unit with all hardware captured therein.

34. A shaft and flexible coupling assembly according to claim 33 and including means connecting said flexible couplings to said shaft member so that said shaft and flexible coupling assembly has all hardware captured therein.

35. A coupling according to claim 1 wherein said first and second flange-type members have flat outboard surfaces lying in a plane normal to the coupling axis.

36. A coupling according to claim 35 and including means to connect said first and second flange-type members to the driving and driven shafts including a bushing member supported in and extending through said first and second flange-type members and terminating in said outboard surface, and nut support means connected to said flange members and adapted to support a nut at the opposite end of said bushing, and a nut member so supported at the interior end of said bushing.

37. A coupling according to claim 36 wherein said first and second flange-type members, said strap members, and said connecting means are operatively connected so that the flexible coupling is a single unit with all hardware captured therein.

38. A flexible coupling for drivingly connecting a driving rotating shaft adapted to be driving in a single direction of rotation in operation to a driven rotating shaft adapted to be driven in that single direction of rotation in operation while permitting substantial misalignment variation between the shaft axes comprising:
(1) a first flange-type member adapted to be connected to the driving shaft and being of circular cross section and concentric about the coupling axis,
(2) a second flange-type member adapted to be connected to the driven shaft and being of circular cross section and concentric about the coupling axis,
(3) at least three flexible, fixed length strap members positioned in substantially continuous circumferential array between said flange-type members and with the opposite ends of each strap member being directly connected to said first and second flange-type members, respectively, so that the location of the coupling axis is determined by the strap members and so that the strap members are equally loaded in tension as driving loads are imparted therethrough as said first flange-type member drives said second flange-type member.

* * * * *